(12) United States Patent
Grant et al.

(10) Patent No.: US 11,142,135 B2
(45) Date of Patent: Oct. 12, 2021

(54) MOUNT AND ACCESSORY SUCH AS A CAMERA FOR MOUNTING IN A VEHICLE

(71) Applicant: Portable Multimedia Ltd, West End (GB)

(72) Inventors: Robert George Grant, West End (GB); Graham Keith Lambert, West End (GB); Ceri Hill, West End (GB)

(73) Assignee: Portable Multimedia Limited

(*) Notice: Subject to any disclaimer, the term of this patent is extended or adjusted under 35 U.S.C. 154(b) by 111 days.

(21) Appl. No.: 16/263,383

(22) Filed: Jan. 31, 2019

(65) Prior Publication Data

US 2020/0215989 A1    Jul. 9, 2020

(30) Foreign Application Priority Data

Jan. 7, 2019 (GB) .................................. 1900215

(51) Int. Cl.
*B60R 11/04* (2006.01)
*B60R 11/00* (2006.01)

(52) U.S. Cl.
CPC ....... *B60R 11/04* (2013.01); *B60R 2011/0003* (2013.01); *B60R 2011/007* (2013.01);
(Continued)

(58) Field of Classification Search
CPC ............. B60R 11/04; B60R 2011/0003; B60R 2011/0068; B60R 2011/007; B60R 2011/0077; B60R 2300/10
See application file for complete search history.

(56) References Cited

U.S. PATENT DOCUMENTS 7,621,492 B2   11/2009 Omps
D803,920 S  *  11/2017 Shin ............................ D16/203
(Continued)

FOREIGN PATENT DOCUMENTS

CN      207416725 U    5/2018
CN      208119076 U   11/2018
(Continued)

OTHER PUBLICATIONS

Search Report including Written Opinion for GB1900215.3 dated Jun. 19, 2020; 5 pages.
(Continued)

*Primary Examiner* — Antoinette T Spinks
(74) *Attorney, Agent, or Firm* — Lerner, David, Littenberg, Krumholz & Mentlik, LLP

(57) ABSTRACT

A mount for mounting an accessory, the mount comprising: an attachment member to attach the mount to a support structure; and a mount coupling member configured to have a profile complementary to a corresponding accessory coupling member of an accessory to be coupled to the mount. The mount coupling member comprises a first material operative to couple to a second material of an accessory coupling member through an attractive force between the first material and second material; and wherein the attractive force is of a magnitude to permit slideable movement of the mount coupling member relative to an accessory coupling member while maintaining mechanical contact between the mount and an accessory. The first material comprises a complementary configuration with a second material of an accessory coupling member to permit a greater magnitude of the slideable movement in a first direction compared to a second direction transverse to the first direction.

11 Claims, 5 Drawing Sheets

(52) U.S. Cl.
CPC ............... *B60R 2011/0068* (2013.01); *B60R 2011/0077* (2013.01); *B60R 2300/10* (2013.01)

(56) References Cited

U.S. PATENT DOCUMENTS

| | | | |
|---|---|---|---|
| D885,456 S * | 5/2020 | Tiersen | D16/203 |
| 2008/0008467 A1 * | 1/2008 | Liu | G03B 17/02 |
| | | | 396/427 |
| 2008/0056709 A1 * | 3/2008 | Huang | G03B 17/561 |
| | | | 396/427 |
| 2013/0302023 A1 | 11/2013 | Chamberlayne | |
| 2015/0281650 A1 * | 10/2015 | Mohan | G08B 15/001 |
| | | | 348/143 |
| 2015/0345699 A1 * | 12/2015 | Manniche | F16M 13/022 |
| | | | 29/428 |
| 2017/0272641 A1 * | 9/2017 | Helm | G06K 9/00228 |
| 2018/0056888 A1 | 3/2018 | Wang | |

FOREIGN PATENT DOCUMENTS

| | | |
|---|---|---|
| CN | 109263567 A | 1/2019 |
| CN | 208682754 U | 4/2019 |
| WO | 2015070605 A1 | 5/2015 |
| WO | 2015187326 A1 | 12/2015 |

OTHER PUBLICATIONS

Partial International Search Report including Written Opinion for PCT/GP2020/050019 dated Jul. 16, 2020; 5 pages.

\* cited by examiner

MOUNT AND ACCESSORY SUCH AS A CAMERA FOR MOUNTING IN A VEHICLE

CROSS REFERENCE TO RELATED APPLICATIONS

The present application claims priority from U.K. Patent Application No. GB 1900215.3 filed on Jan. 7, 2019, all of which are hereby incorporated herein by reference.

TECHNICAL FIELD

The present invention relates to a mount assembly, a mount and an accessory for coupling to the mount to form a mount assembly. In particular, but not exclusively, the present invention relates to a mount assembly comprising a camera.

BACKGROUND

In-vehicle cameras, sometimes referred to as "Dash Cams" because they are often situated on or adjacent a vehicle dashboard, are becoming increasingly common and are often installed into a vehicle after the overall vehicle has been manufactured, as an "after-sales" modification or personalisation of the vehicle by a user. Additionally, rear facing cameras are utilised and may be mounted adjacent or on a rear window of a vehicle to provide a field of view through the rear window of the vehicle.

Typically, an in-vehicle camera is of a substantially cuboid or rectangular cuboid shape to accommodate a camera lens and ancillary circuitry. Additionally, the in-vehicle camera is mounted to the superstructure of the vehicle or window by way of an adhesive or suction attachment coupled to the camera through an arm so that the camera field of view is not obstructed by the adhesive or suction attachment or superstructure of the vehicle. Optionally, the arm may be movably attached to one other or both of the attachment or camera. Such movable attachment may be by way of a ball and socket joint in which the ball may be tightened around the socket by way of a screw thread and nut arrangement or some other mechanism may be utilised for maintaining the orientation of the arm once it has been moved to a desired position.

However, the mass of the camera together with the length of the arm may create a turning force ("moment") sufficient to change the orientation of the arm when the vehicle accelerates or decelerates or experiences rough roads or terrain. Thus, the desired field of view from the camera may be lost. Additionally, a cuboid camera housing, and in particular a rectangular cuboid housing, may result in a further turning force because it would be difficult to couple the arm to the housing at a centre of gravity for the camera thereby further encouraging a turning force. In the event the vehicle should experience a severe change in speed, for example such as may occur in the event of the vehicle crashing into something, the force experienced by the camera may be such that the turning force causes the camera to be detached from the arm or the arm itself to be detached from the attachment such that the camera may fly through the interior of the vehicle possibly causing injury to one or more vehicle occupants and/or damage to the vehicle itself.

Universal magnetically coupled ball and socket joints are also known, such as disclosed in U.S. Pat. No. 7,621,492B2.

The present invention has been devised with the foregoing in mind.

SUMMARY

Viewed from a first aspect, there is provided a mount for mounting an accessory, the mount comprising:
an attachment member to attach the mount to a support structure; and
a mount coupling member configured to have a profile complementary to a corresponding accessory coupling member of an accessory to be coupled to the mount;
the mount coupling member comprising a first material operative to couple to a second material of an accessory coupling member through an attractive force between the first material and second material; and
wherein the attractive force is of a magnitude to permit slideable movement of the mount coupling member relative to an accessory coupling member while maintaining mechanical contact between the mount and an accessory;
the first material comprising a complementary configuration with a second material of an accessory coupling member to permit a greater magnitude of the slideable movement in a first direction compared to a second direction transverse to the first direction.

Viewed from a third aspect, there is provided an accessory and mount assembly, comprising a mount and an accessory as briefly described above.

In general outline, one or more embodiments in accordance with the present invention provide a magnetically mountable in-vehicle camera.

Restricting the relative motion in the second direction compared to the magnitude of travel in a transverse first direction reduces the opportunity for a user to incorrectly position an accessory since there are only a limited number of positions in which coupling can take place. A large adjustment may be made in the first direction and minor adjustment made in the transverse direction to correct small misalignments.

Suitably, the movement in the first direction is of a magnitude to permit maintenance of an orientation of an accessory mounted in the mount for the attachment member fixed to a support structure having an attachment surface plane in a range of 0° to 60°, more particularly in a range of 0° to 80°, yet more particularly in a range 0° to 90°. This is particularly useful if the attachment surface may be a wall, e.g. vertical, or a lintel or ceiling, e.g. horizontal.

Suitably, the movement in the second direction is in a range of +/−10° relative to the first direction, more particularly in a range of +/−5° relative to the first direction, thereby providing a fine range of adjustment.

Optionally, the first material comprises a complementary configuration with a second material of an accessory coupling member such that the first direction is coaxial to permit rotation of an accessory relative to the mount in a plane transverse to the second direction.

In such an optional embodiment, first material comprises a complementary configuration with a second material of an accessory coupling member to permit a greater magnitude of the slideable movement in the first direction compared to a third direction transverse to the plane of the first direction.

In such an optional embodiment the movement in the third direction is in a range of +/−10° relative to the plane of the first direction, more particularly in a range of +/−5° relative to the plane of the first direction.

The first material may be a magnetic material which is a convenient and readily available source of an attractive force. Suitably, the first material is a permanent magnet which avoids the need for generating a magnetic field such as by using an electro-magnet configuration. In particular, the first material is a permanent, rare earth magnetic material which may withstand greater temperature before losing its magnetisation compared to a ferrous magnet.

In one or more embodiments the mount further comprises a silicone member to provide a tactile feedback to a user when sliding the mount coupling member over an accessory coupling member. In particular, the silicone member provides a constant sliding resistance to sliding of the mount coupling member over an accessory coupling member.

In one or more embodiments, the mount coupling member is supported by the mount to expose the first material to provide a coupling surface which may assist in a strong coupling between the mount and accessory. Typically, the silicone member extends from the coupling surface.

Suitably, the mount coupling member comprises a circular peripheral outline which provides for the generation of a symmetrical force across the width of the mount coupling member. Typically, the silicone member is disposed at the centre of the mount coupling member.

In one or more embodiments, the mount coupling member is configured to have a curved profile and in particular the mount coupling member profile may be concave.

Viewed from a second aspect, there is provided an accessory comprising:

an accessory coupling member configured to have a profile complementary to a corresponding mount coupling member of a mount to be coupled to the accessory;

the accessory coupling member comprising a first material operative to couple to a second material of a mount device coupling member through an attractive force between the first material and second material; and wherein the attractive force is of a magnitude to permit slideable movement of the accessory coupling member relative to a mount coupling member while maintaining mechanical contact between the accessory and a mount;

the first material comprising a complementary configuration with a second material of a mount coupling member to permit a greater magnitude of the slideable movement in a first direction compared to a second direction transverse to the first direction.

Restricting the relative motion in the second direction compared to the magnitude of travel in a transverse first direction reduces the opportunity for a user to incorrectly position an accessory since there are only a limited number of positions in which coupling can take place. A large adjustment may be made in the first direction and minor adjustment made in the transverse direction to correct small misalignments.

Suitably, the movement in the first direction is of a magnitude to permit maintenance of an orientation of an accessory mounted in the mount for the attachment member fixed to a support structure having an attachment surface plane in a range of 0° to 90°, more particularly in a range of 0° to 80°. This is particularly useful if the attachment surface may be a wall, e.g. vertical, or a lintel or ceiling, e.g. horizontal.

Suitably, the movement in the second direction is in a range of +/−10° relative to the first direction, more particularly in a range of +/−5° relative to the first direction, thereby providing a fine range of adjustment.

In an optional embodiment, the first material comprises a complementary configuration with a second material of a mount coupling member such that the first direction is coaxial to permit rotation of the accessory relative to a mount in a plane transverse to the second direction.

In such an optional embodiment, the first material comprises a complementary configuration with a second material of a mount coupling member to permit a greater magnitude of the slideable movement in the first direction compared to a third direction transverse to the plane of the first direction.

In such an optional embodiment, the movement in the third direction is in a range of +/−10° relative to the plane of the first direction, more particularly in a range of +/−5° relative to the plane of the first direction.

The first material may be a magnetic material which is a convenient and readily available source of an attractive force. Suitably, the first material is a permanent magnet which avoids the need for generating a magnetic field such as by using an electro-magnet configuration. In particular, the first material is a permanent, rare earth magnetic material which may withstand greater temperature before losing its magnetisation compared to a ferrous magnet.

In one or more embodiments, the accessory coupling member is supported by the mount to expose the first material to provide a coupling surface which may assist in a strong coupling between the mount and accessory.

Suitably, the accessory coupling member is configured to have a curved profile, in particular the accessory coupling member profile is convex.

Suitably, the accessory comprises a housing, said accessory coupling member comprising a profile complementary to the housing. In one or more embodiments the housing comprises a spherical housing.

Suitably, the accessory coupling member extends through a region of the accessory to provide a plurality of positions for coupling the accessory to a mount.

In one or more embodiments, the accessory is a camera, more particularly the camera is an in-vehicle camera.

BRIEF DESCRIPTION OF THE DRAWINGS

One or more embodiments of the present invention are described further hereinafter, by way of non-limiting example only, with reference to the accompanying drawings in which.

DETAILED DESCRIPTION OF THE INVENTION

Figure 1:
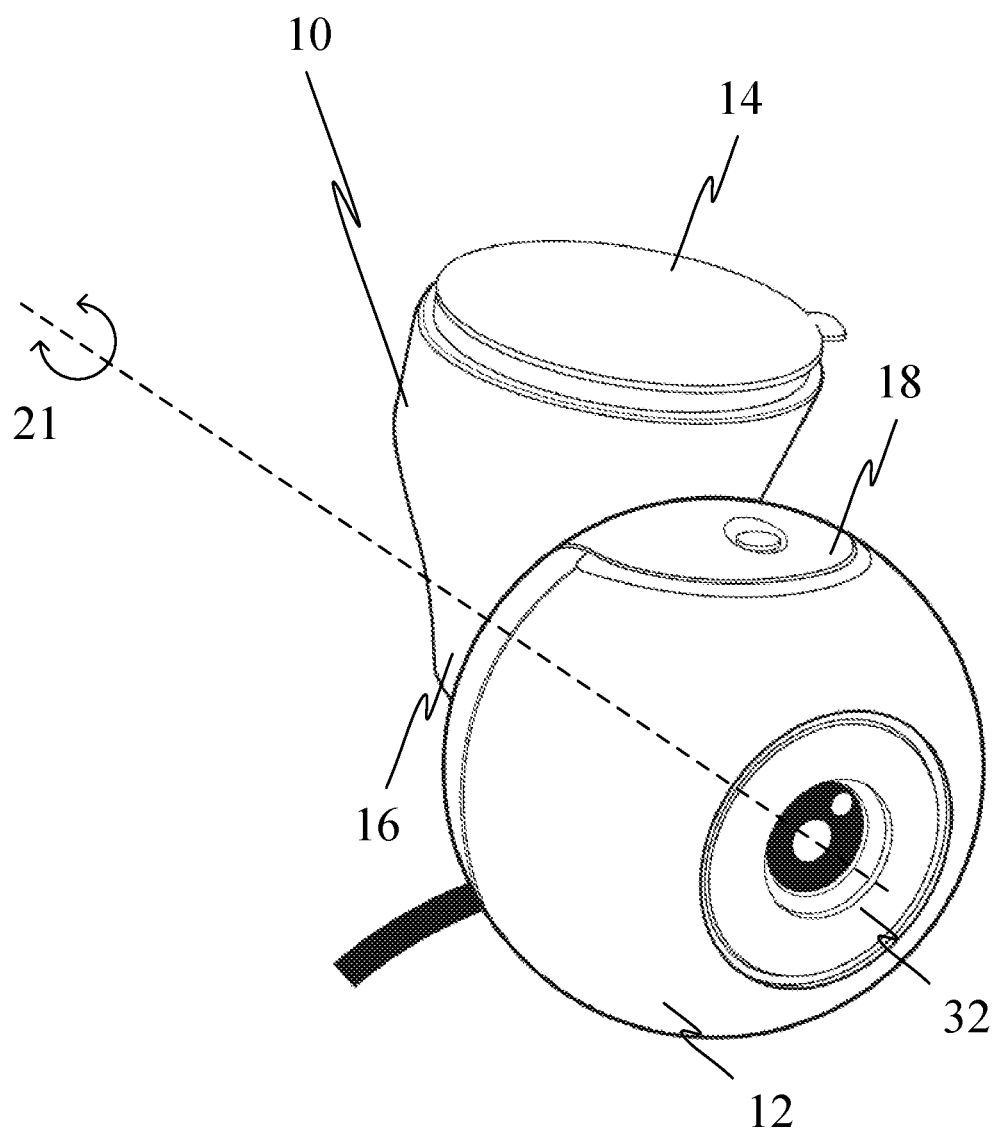
FIG. 1 schematically illustrates an isometric projection of a mount and "eye-ball" camera in a coupled configuration in accordance with an embodiment of the present invention.

FIG. 1 is an illustrative example of a mount 10 and "eye-ball" camera 12 in a coupled configuration in accordance with an embodiment of the present invention. Mount 10 comprises an attachment member 14 at a first end of the mount 10 and can be removably attached to a structure such as the interior of a vehicle and more specifically a window of the vehicle. The attachment member 14 may be comprised of a self-adhesive material such as a 3M™ sticky foam pad or similar material. Attachment member 14 may also comprise a suction pad so as to allow the mount 10 to be repositioned. The mount 10 also comprises a mount coupling member 16 comprising first material in the form of a Neodymium magnet 20 which is located at a second end of the mount 10. The mount coupling member 16 may be configured so as to be removably attachable to the "eye-ball" camera 12 by way of the magnetic force provided by the Neodymium magnet between the mount coupling member 16 and a camera coupling member 18.

In the illustrated embodiment it can be seen that the mount 10 and "eye-ball" camera 12 can be rotated 21 about their common axes. This provides up to 360 degrees of coaxial rotation in this common axes 21 due to the common shape between the elements of the mount 10 and the "eye-ball" camera 12. Optionally, in other examples, it may be desired to limit the rotation to less than 360 degrees by way of limiting device and the like.

Figure 2:
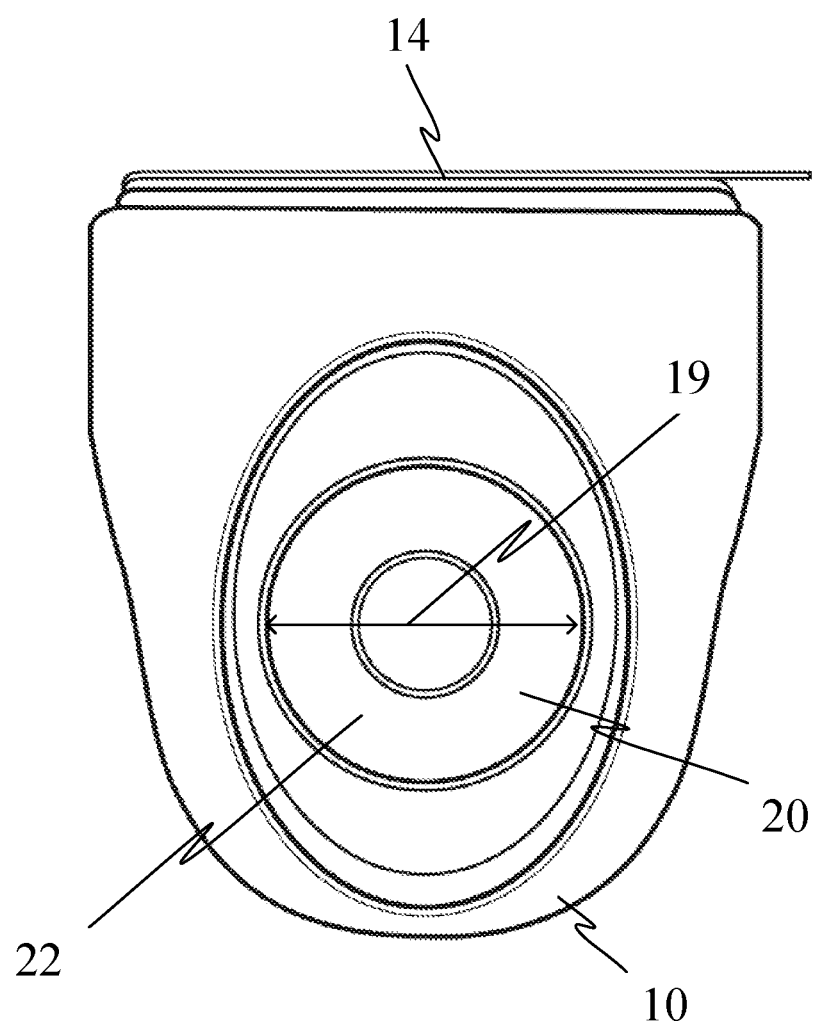
FIG. 2 schematically illustrates a plan view of a mount for mounting an "eye-ball" camera to a support structure in accordance with an embodiment of the invention.

FIG. 2 is an illustrative example of the mount 10 when viewed in a plan view, i.e. when viewed tangentially from the second end of the mount 10 in accordance with an embodiment of the present invention. The "eye-ball" camera 12 of FIG. 1 is not shown here. In this embodiment, mount 10 comprises a mount coupling member 16 having a concave configuration which matches the shape of magnetisable material on the "eye-ball" camera 12 to which the mount coupling member 16 couples. The "eye-ball" camera is so termed because it is substantially spherical, much like an eye-ball, and so the magnetisable material follows the outer contour of the camera 12. The mount coupling member 16 comprises the Neodymium magnet 20 and a spacer 22 which is located at the centre of the magnet 20. Neodymium has a higher coercivity than iron magnets therefore Neodymium maintains its magnetic properties for longer than is the case for a ferrous magnet. The specific rare earth magnet, such as Neodymium, is chosen to have a curie temperature outside of a reasonably anticipated temperature likely to be experienced in a vehicle.

The spacer 22 is optional and may be of a resilient and/or resistive material such as a silicone material and exposed sufficiently above the surface of the magnet 20 such that it will be in contact with any "eye-ball" camera coupled to the mount 10. The optional spacer 22 of resilient and/or resistive material may be located on a spring such that if material is worn away the spring applies a small outward force tangentially to the surface of it. The force applied by the spring will maintain the distance that the optional spacer 22 of resistive and/or resilient material is exposed above the first material 20. It will be appreciated that any other frictionous material may be used for this purpose and the force applied to it may be provided by a mechanism other than a spring.

In one or more embodiments, the spring is a magnetic "floating spring" ie a cylindrical magnet within a cylindrical cut out of the main magnet which attempts to align itself due to it being the same height and hence is biased to raise the silicone above the surface of the concavity if the arc were continued.

In one or more embodiments the silicone spacer material provides a sliding resistance or friction ("sticktion") to provide a user with positive tactile feedback as the mount is slideably moved over the camera.

The mount attachment member 14 can be seen to be in a plane which is substantially tangential or perpendicular to the plane of the mount coupling member 16. When the mount 10 is secured to a surface by way of the attachment member 14 the direction normal to the plane of first material 20 will be substantially parallel to the plane of the surface upon which it is attached.

In this embodiment the mount 10 is designed to have a minimal footprint upon the surface that it is mounted upon. In the field of dashcams and specifically rear view dash cams it is advantageous to have a small footprint so as to maintain visibility through the windscreen (windshield) for the driver of the vehicle.

Figure 4A:
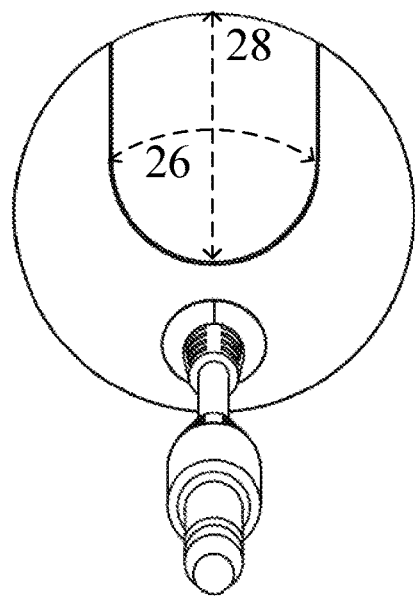
FIG. 4a schematically illustrates an isometric projection of an "eye-ball" camera which may be mounted to a mount in accordance with an embodiment of the invention.

FIG. 4a is an illustrative example showing an isometric projection of the "eye-ball" camera 12 when viewed from a first position in accordance with an embodiment of the present invention. Such an "eye-ball" camera 12 may be shaped such that it is complementary to the shape of the mount 10. In this embodiment, the "eye-ball" camera is spherical in shape. The "eye-ball" camera 12 comprises a second magnetisable material 24 disposed on its surface 23. The second magnetisable material 24 may be positioned such that it is flush with or proud of the surface 23. It may also be located under the surface of the "eye-ball" camera.

The second magnetisable material 24 has a width 26 and length 28. It will be appreciated that the width 26 and length 28 of the magnetisable material 24 is the length along the surface of the magnetisable material 24 and as such they follow the curve of the shape of the magnetisable material 24. The magnetisable material is a material 24 such that when brought into proximity with the magnet 20 there is an attractive force between the two. Thus, the second material 24 is comprised of material that will experience a magnetic attraction to magnet 20 such as a metal. Other materials may be used such that there is an attractive force between the first and second material of the mount 10 and "eye-ball" camera 12 respectively; the materials are not limited to magnetic materials and the example of such is used for illustrative purposes only.

The shape of the magnetisable material 24 is such that when brought into contact with the mount 10 it fits into the concave shape of the first material 20 and is held in a positive coupling configuration by the magnetic force between the two materials. Due to the spherical shape of the "eye-ball" camera 12 there are a number of possible coupling arrangements between it and the mount 10. This allows a user to couple the "eye-ball" camera 12 at position relative to the mount 10 so long that there is a sufficient magnetic force between the magnet 20 and second magnetisable material 24. The "eye-ball" camera 12 and mount 10 can be moved about the common central points. For example, when positioning the mount 10 onto a support surface by way of the attachment member 14 the user may make a mistake in the angle of placement of said mount 10. Without the flexibility to position the "eye-ball" camera 12 in a number of positions relative to the mount 10 it may be that the "eye-ball" camera is facing the wrong angle for desired use.

Existing technologies use other mounting mechanisms to account for this problem such as using a ball joint type connecting arm and the like. The disadvantage of this is that is increases the quantity of moving parts which can lead to more components to damage. The device will also be held at a greater distance from the support surface on which the mount is fixed meaning that any forces subjected to it by movement of the support surface will be increased. Moreover, when removing the device the position of the arm/ball joint may be altered. This means that when placing the device back, the mount has to be reset. If a universal joint is utilised, there is a significant degree of freedom for a user to incorrectly mount the camera 12 but by restricting the coupling position and movement by appropriately dimensioning the magnet 20 and shaping the magnetisable material 24 the user is restricted to the positions they can orient the camera 12 and maintain coupling to the mount 10 as described further below.

Figure 3:
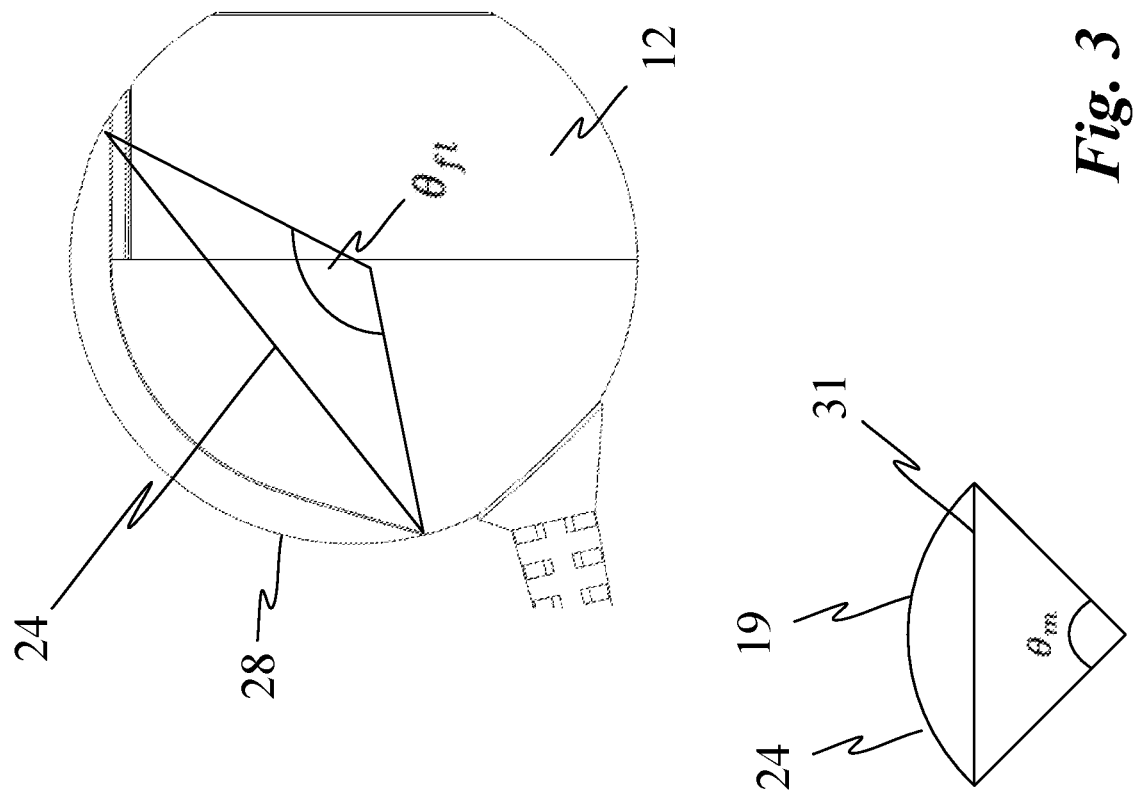
FIG. 3 schematically illustrates a view of a mount for mounting an "eye-ball" camera to a support structure in accordance with an embodiment of the invention.
Figure 3:
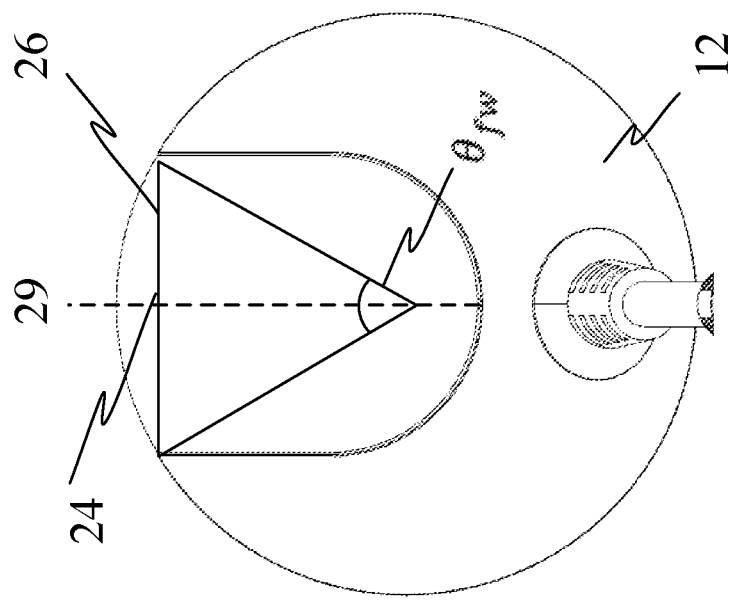

By using a coupling arrangement such as the one described in relation to FIGS. 1-3 above, the user is able to removably couple and decouple the "eye-ball" camera 12 to the mount 10 in a simplified and repeatable manner. The ratio of the width 26 of the second magnetisable material 24 to the width 19 of the magnet 20 is greater than 1. That is, the width 26 of the second magnetisable material 24 is greater than the width 19 of the magnet 20. The technical effect of this is to limit the motion of the "eye-ball" camera 12 in one axis across the width 26 of the "eye-ball" camera 12. The magnet 20 is not required to be in full contact with the second magnetisable material 24 across its whole width 19. The strength of the attractive force between the magnet 20 and second magnetisable material 24 is sufficient to securely maintain the "eye-ball" camera 12 in a coupled position when the magnet 20 is only partially contacting the second magnetisable material 24.

This reduces freedom of movement of the "eye-ball" camera 12 relative to the mount 10 along one direction. That is to say there are a reduced amount of angles at which the device 12 can be relative to the mount 10.

However, the length 28 of the second magnetisable material 24 extends substantially around the device 12 and permits movement of the device in a much greater range of angles when in coupled configuration with the mount 10.

In some embodiments the "eye-ball" camera 12 may be an auxiliary camera for use with a dashcam system within a vehicle. The cable 30 transmits images captured by the "eye-ball" camera 12 to a storage system or other camera which it is connected to. The images captured by the "eye-ball" camera may be captured with a CCD chip or similar system. It is then serialised to be transmitted elsewhere via data and power cable 30.

To estimate the minimum chord length 28 and chord width 26 of the second magnetisable material 24 required to achieve the desired adjustment in the two axis the approach is taken that a complete overlap of second magnetisable material 24 and magnet 20 is required. Optionally, in other estimations of the minimum width and length, the calculation may be done using other approaches such as 50% overlap between the first and second materials. Moreover, reference is made to FIG. 3 which is an illustrative example of an "eye ball" camera 12 showing the symbols for the equations set out below marked thereupon. The following equations show the relationship between width 26 and length 28 of second magnetic material 24 and the desired angles of adjustment:

$$\text{Arc angle of the second material 24 width} = \theta_{fw}$$

$$\text{Arc angle of the magnet 20} = \theta_m$$

$$\text{Horizon level angular adjustment} = \frac{\theta_{fw} - \theta_m}{2}$$

The horizontal level of angular adjustment is the angle about the common central point of and away from the centre line 29 that the "eyeball camera" can be moved while maintaining the complete overlap.

The angular adjustment of the windscreen angle is calculated as:

$$\text{Arc angle of the second material 24 length} = \theta_{fl}$$

$$\text{Windscreen angle angular adjusmtent} = \theta_{fl} - \theta_m$$

The windscreen angle of angular adjustment is the angle along the centre line 29 about the common central point that the "eyeball camera" can be moved while maintaining the complete overlap between the first and second materials.

With the above definitions the chord width 26 and chord length 28 of the second material 24 can be calculated to match the required adjustments.

$$\text{Angle of arc} = \sin^{-1}\left(\frac{\text{Chord length}}{2*R}\right)*2$$

TABLE 1

| | |
|---|---|
| Chord size 31 of first material (mm) | 15.00 |
| Magnet 20 arc angle (degrees) | 45.86 |
| Angular adjustment from horizontal (assuming mount is horizontal) in each direction (degrees) | 5.00 |
| Angular adjustment up and down (degrees) | 80.00 |
| Required second material 24 chord width 26 (mm) | 18.03 |
| Required second material 24 chord length 28 (mm) | 34.28 |

Table 1 above is a specific example of a calculation for the minimum chord length 28 and chord width 26 of the second material 24 that may be used for a desired angle of adjustment of 5 degrees and 80 degrees. The calculation shows that to achieve this, a chord length and width of the second material that is on the "eyeball camera" 12 is 34.28 mm and 18.03 mm respectively.

Figure 4B:
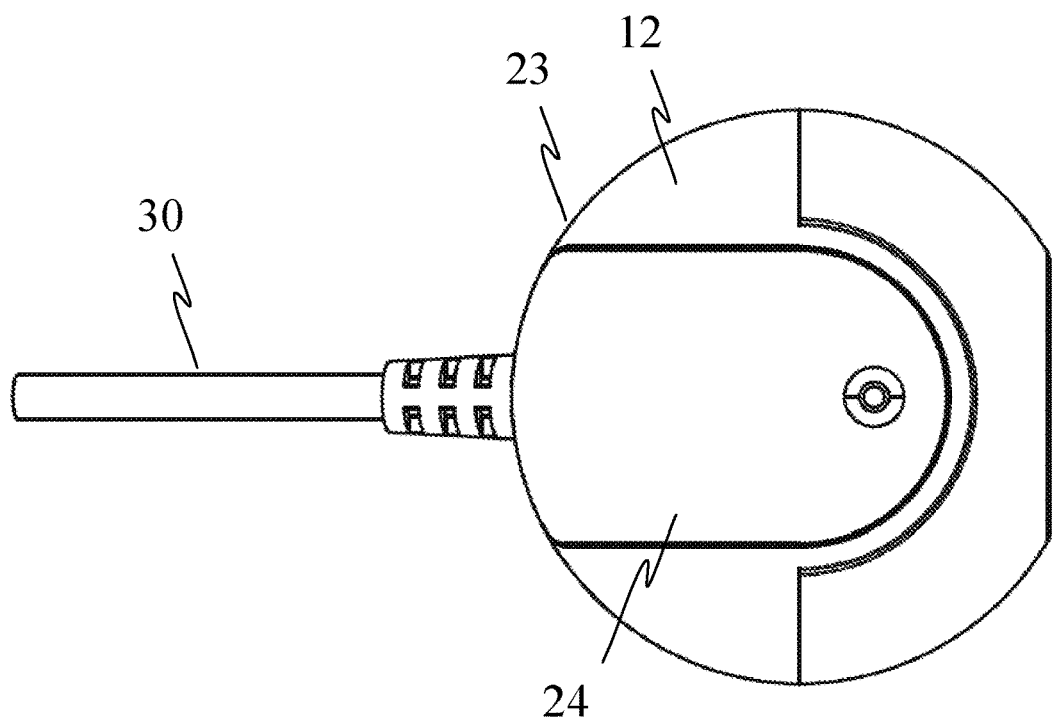
FIG. 4b schematically illustrates an plan view of an "eye-ball" camera, viewed from a second perspective, which may be mounted to a mount in accordance with an embodiment of the invention.

FIG. 4b is an illustrative example showing an isometric projection of the "eye-ball" camera 12 when viewed from a second position in accordance with an embodiment of the present invention. Viewed from this position the second magnetisable material 24 can be seen to extend from the top of the "eye-ball" camera 12 in a lengthwise direction toward the power and data cable 30.

Figure 5:
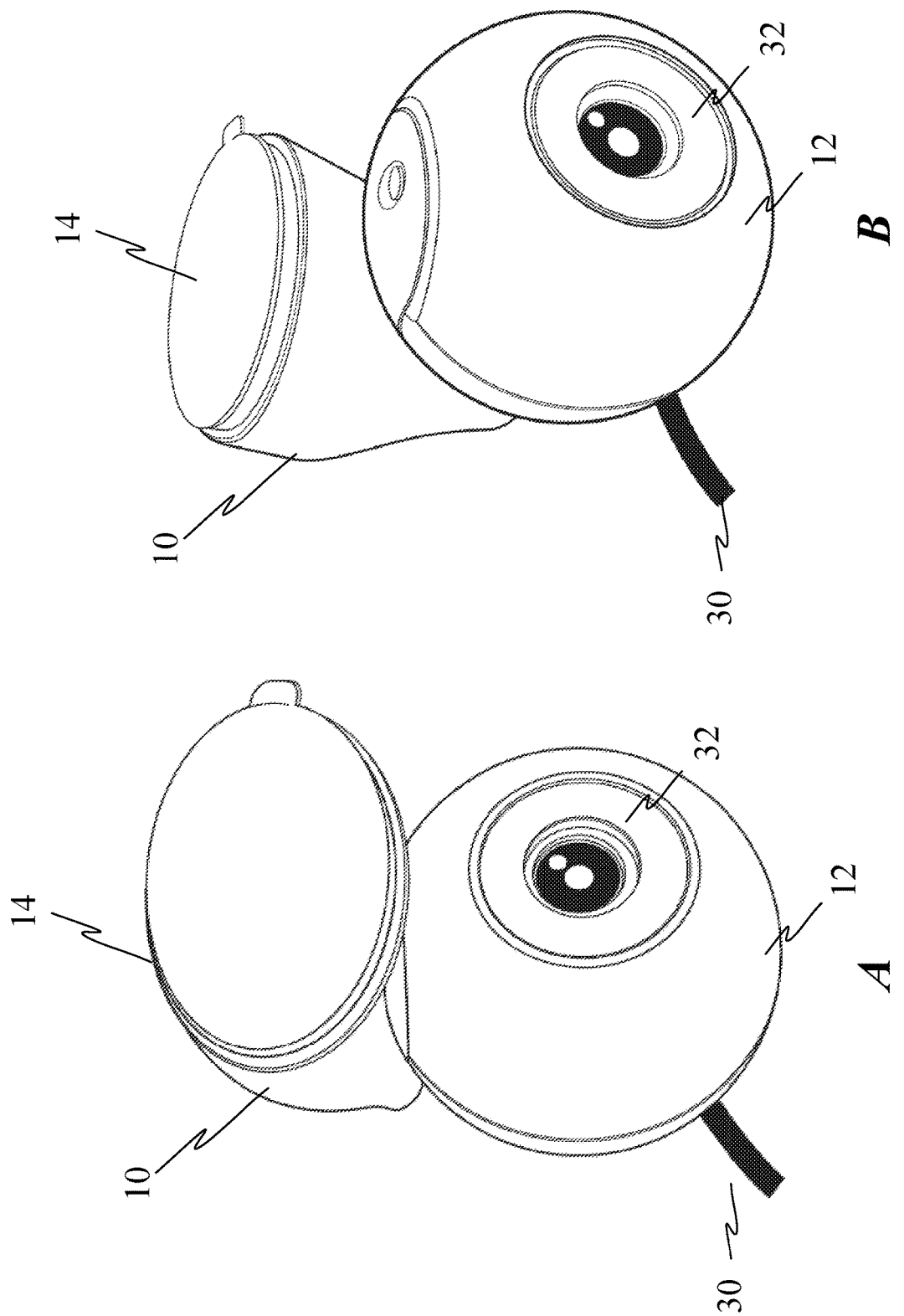
FIG. 5 schematically illustrates two isometric projections of an "eye-ball" camera which may be mounted to a mount in accordance with an embodiment of the invention.

To illustrate the range of angles that the "eye-ball" camera 12 can move relative to the mount 10 while maintaining a coupled configuration FIG. 5 is provided and described. FIG. 5 is an illustrative example showing two isometric projections of the "eye-ball" camera 12 and mount 10 when viewed from a common position in accordance with an embodiment of the present invention. In this image a camera 32 can be seen to be situated at the front of the "eye-ball" camera 12. At position A the "eye-ball" camera 12 is in a coupled configuration such that the relative angle between the plane of the mounting surface 14 of the mount and the plane of the camera is approximately parallel. At position B the "eye-ball" camera 12 is in a coupled configuration such that the relative angle between the plane of the mounting surface 14 of the mount and the plane of the camera is substantially different to position A. The mount 10 has been moved backwards along the length of the second material 24 of "eye-ball" camera 12 and rotated about the common axis between the "eye-ball" camera and mount.

Any references made herein to orientation (e.g. top, bottom, upper, lower, front, back, and rear) are made for the purposes of describing relative spatial arrangements of the features of the apparatus, and are not intended to be limiting in any sense.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, the terms "a" or "an" are employed to describe elements and components of the invention. This is done merely for convenience and to give a general sense of the invention. This description should be read to include one or at least one and the singular also includes the plural unless it is obvious that it is means otherwise.

In view of the foregoing description it will be evident to a person skilled in the art that various modifications may be made within the scope of the invention. For example, embodiments in accordance with the invention are not limited to any of the particular materials disclosed herein. Other materials suitable for performing the function described herein for a particular material may also be utilized in embodiments of the invention. For example, although an embodiment in accordance with the present invention has been described with reference to a rear window in-vehicle camera a skilled person will understand that a forward facing, front window in-vehicle camera may also utilise, and/or be utilised in, an embodiment of the present invention. The mount, "eye-ball" camera and mount assembly taught herein may be utilised for mounting a variety of different camera or accessories or other apparatus whether in a vehicle or elsewhere.

A magnetic force has been described as the force which couples the camera and mount together as it is a particularly suitable force for that purpose but other forces may be employed. In the above-described one or more embodiments, a magnetic material 20 has been disclosed as providing an attractive force. The magnetic material 20 need not be limited to neodymium but may be another rare-earth magnetic material, or a permanent ferrous magnetic material. However, the first material 20 may be of any material such that a material on any corresponding device 12 is attracted to it and need not be limited to a magnetic material and magnet force.

A magnetisable material has been referred to in the foregoing description. Such a material includes a material that is magnetisable to become magnetised itself as well as a material that is merely attracted to a magnet force without becoming magnetised. A specific example would be a metal plate such as a ferrous metal plate, or a region of the eye-ball camera housing impregnated with a magnetisable material such as a ferrous material.

Although and embodiment has been described with a magnet disposed on the mount, the magnet may be disposed on the accessory and the magnetisable material disposed on the mount. Optionally, the magnetisable material may be a magnet also.

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

The invention claimed is:

1. A mount for mounting an accessory, the mount comprising:
    an attachment member to attach a mount to a support structure;
    a mount coupling member configured to have a profile complementary to a corresponding accessory coupling member of an accessory to be coupled to the mount, the accessory is disposed and coupled within the mount, and wherein the accessory is removably coupled and decoupled to the mount in a simplified and repeatable manner;
    the mount coupling member comprising a first material, having a first width, and operative to couple to a second material, having a second width, of an accessory coupling member through an attractive force between the first material and the second material, and wherein the second width is greater than the first width;
    wherein the attractive force is of a magnitude to permit a slideable movement of the mount coupling member relative to the accessory coupling member while maintaining mechanical contact between the mount and the accessory;
    the first material comprising a complementary configuration with the second material of the_accessory coupling member to permit a greater magnitude of the slideable movement in a first direction compared to a second direction transverse to the first direction;
    the movement in the second direction is in a range between +/−10° relative to the first direction; and
    the movement in the first direction is greater than the movement in the second direction for limiting motion of the accessory in one axis across the second direction of the accessory.

2. A mount according to claim 1, wherein the movement in the first direction is of a magnitude to permit maintenance of an orientation of an accessory mounted in the mount for the attachment member fixed to a support structure having an attachment surface plane in a range between 0° to 90°.

3. A mount according to claim 1, wherein the first material comprises a complementary configuration with the second material of the accessory coupling member such that the first direction is coaxial to permit rotation of the accessory relative to the mount in a plane transverse to the second direction.

4. A mount according to claim 3, the first material comprising a complementary configuration with the second material of the accessory coupling member to permit a greater magnitude of the slideable movement in the first direction compared to a third direction transverse to the plane of the first direction.

5. A mount according to claim 3, wherein the movement in the third direction is in a range between +/−10° relative to the plane of the first direction.

6. A mount according to claim 1, wherein the first material is a magnetic material, a permanent magnet, or a permanent, rare earth magnetic material.

7. A mount according to claim 1, the mount further comprising a silicone member to provide a tactile feedback to a user when sliding the mount coupling member over the accessory coupling member; wherein the silicone member provides a constant sliding resistance to sliding of the mount coupling member over the accessory coupling member.

8. A mount according to claim 1, wherein the mount coupling member is supported by the mount to expose the first material to provide a coupling surface.

9. A mount according to claim 1, wherein the mount coupling member comprises a circular peripheral outline.

10. A mount according to claim 9, wherein a silicone member is disposed at a center of the mount coupling member.

11. A mount according to claim 1, wherein the mount coupling member is configured to have a curved profile or concave profile.

* * * * *